W. M. & S. E. LOXLEY.
COMBINED WAGON AND VELOCIPEDE.
APPLICATION FILED FEB. 12, 1916.
1,192,081.
Patented July 25, 1916.
2 SHEETS—SHEET 1.
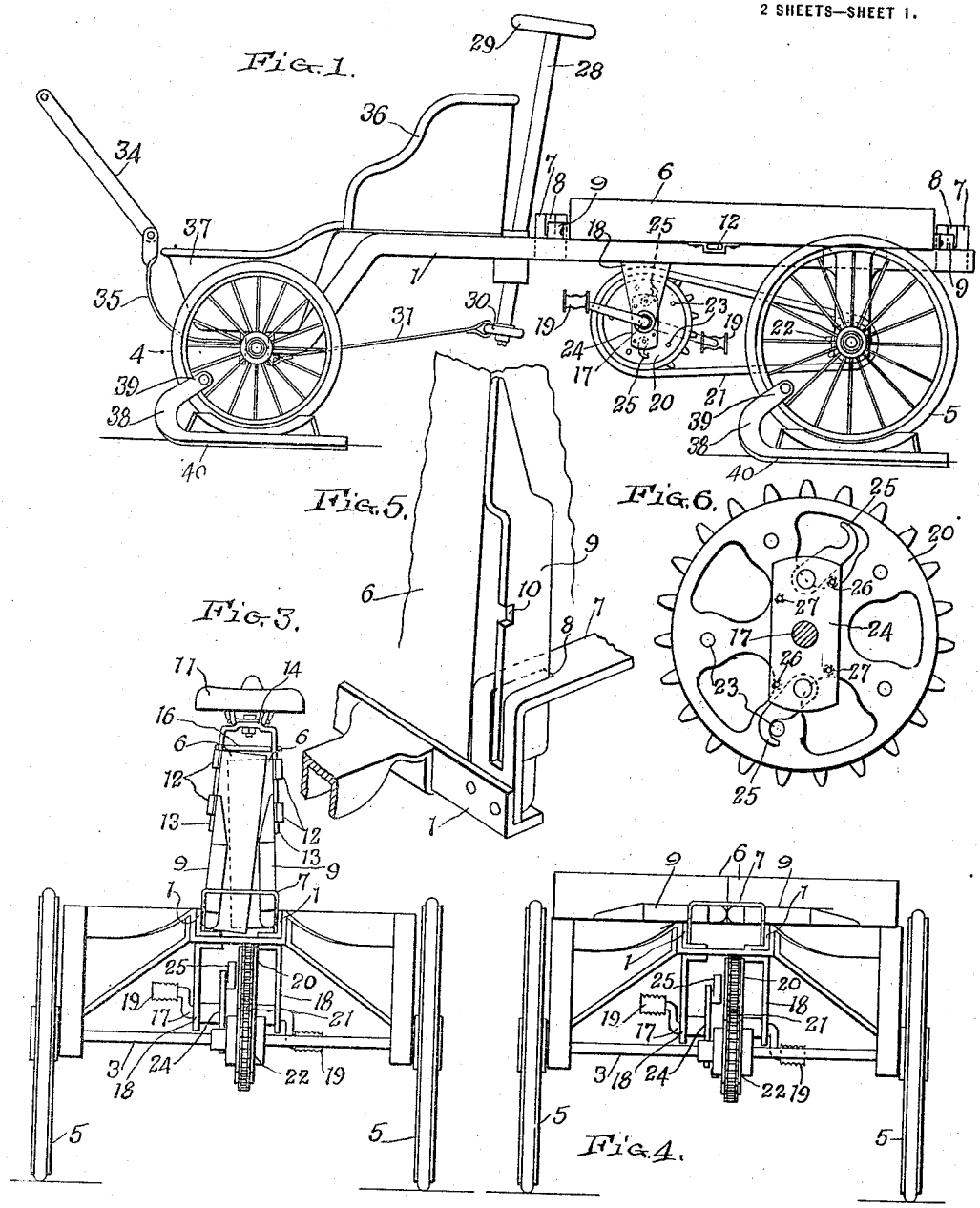
Inventors
Walter M. Loxley,
Samuel E. Loxley,
By Edward T. Reed
Attorney W. M. & S. E. LOXLEY.
COMBINED WAGON AND VELOCIPEDE.
APPLICATION FILED FEB. 12, 1916.
1,192,081.
Patented July 25, 1916.
2 SHEETS—SHEET 2.
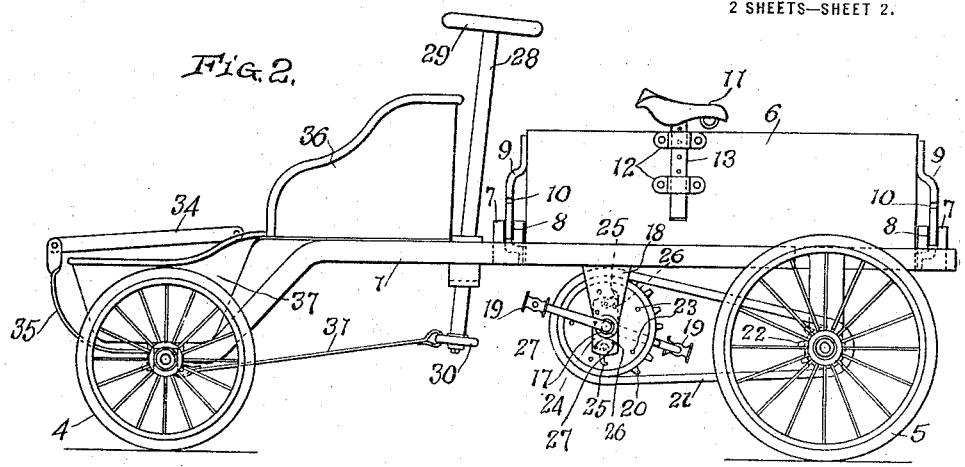
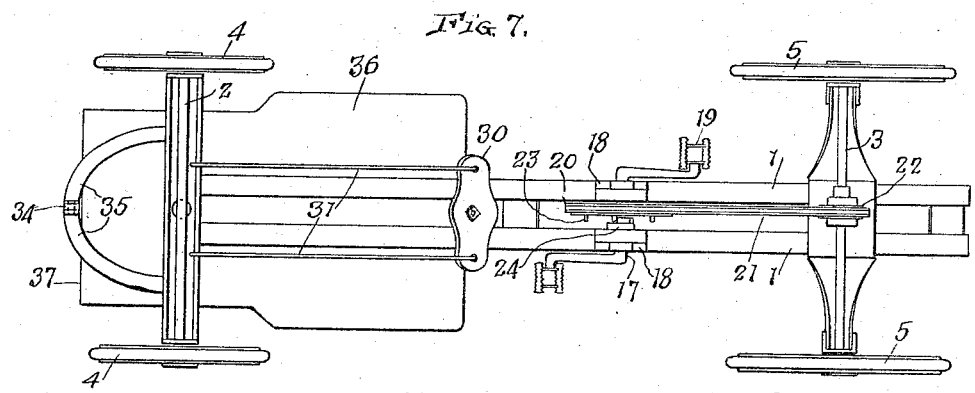
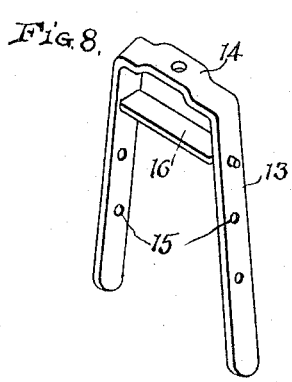
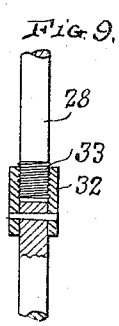
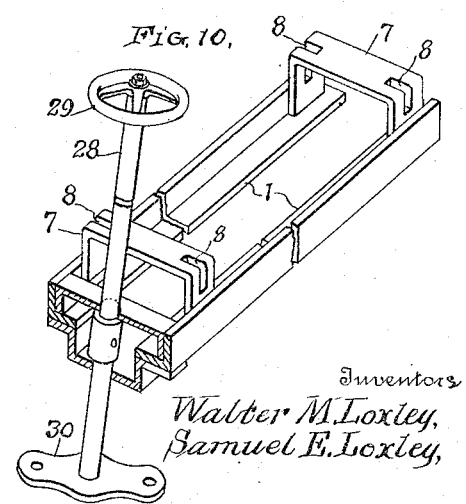
Inventors
Walter M. Loxley,
Samuel E. Loxley,
By
Edward S. Reed, Attorney

UNITED STATES PATENT OFFICE.

WALTER M. LOXLEY AND SAMUEL E. LOXLEY, OF DAYTON, OHIO.

COMBINED WAGON AND VELOCIPEDE.

1,192,081.

Specification of Letters Patent.

Patented July 25, 1916.

Application filed February 12, 1916. Serial No. 77,851.

*To all whom it may concern:*

Be it known that we, WALTER M. LOXLEY and SAMUEL E. LOXLEY, citizens of the United States, residing at Dayton, in the county of Montgomery and State of Ohio, have invented certain new and useful Improvements in Combined Wagons and Velocipedes, of which the following is a specification, reference being had therein to the accompanying drawing.

This invention relates to convertible vehicles and more particularly to a combined wagon and velocipede.

The object of the invention is to provide a vehicle which can be easily and quickly converted from a treadle driven vehicle to a vehicle which can be pulled or drawn by a handle, or tongue.

A further object of the invention is to provide a vehicle of this kind, the body of which may be arranged, at the will of the operator, to form either a wagon bed or a support for a velocipede seat; and to this end it is also an object of the invention to provide such a vehicle with a body portion that can be quickly and easily moved from a horizontal to a vertical position; and to provide simple, durable means for adjustably mounting the parts of the body, for retaining them in their adjusted positions, and for attaching the seat thereto when the parts of the body are in position to receive the same.

It is also an object of the invention to so construct and arrange the steering and driving mechanisms that they will require no adjustment, or change, when the vehicle is converted from one form to the other.

It is also an object of the invention to provide such a vehicle with detachable runners so it can be further converted into a sled.

In the accompanying drawings Figure 1 is a side elevation of a vehicle embodying our invention, showing the body positioned to form a wagon-bed; Fig. 2 is a similar view showing the body positioned to form a support for a velocipede saddle; Fig. 3 is a rear end elevation of such a vehicle when adjusted to constitute a velocipede, as shown in Fig. 2; Fig. 4 is similar view with the body adjusted as shown in Fig. 1; Fig. 5 is a detail view of the connections between the adjustable parts of the body and the main frame; Fig. 6 is a detail view of the overrunning clutch; Fig. 7 is a bottom plan view of the vehicle; Fig. 8 is a detail view of the saddle attaching device; Fig. 9 is a sectional detail view of a portion of the separable steering rod; and Fig. 10 is a detail view partly broken away of the main frame.

In the accompanying drawings we have illustrated one embodiment of our invention and have shown the same as comprising a main frame 1 having at its front and rear ends, respectively, axles 2 and 3 upon which are mounted ground wheels 4 and 5. Mounted upon the main frame 1 is the body portion of the vehicle. In the present instance the body portion is of considerable less length than the main frame and is mounted on the rear portion of the frame. This body portion is of such a character that it can be adjusted to different positions. In one position it constitutes a load receiving portion, or wagon-bed, which, as here shown, is of comparatively shallow depth and of a width greater than the width of the main frame. In another position the body portion extends substantially vertically and constitutes a support for a velocipede saddle, and when in this position it is of a width such as to permit it to be straddled by the rider. To accomplish these adjustments, we prefer to make the body portion in two parts which are connected at their inner edges to the main frame. In the construction illustrated the two parts of the body comprise flat plates 6, preferably of metal, having at their ends and outer edges flanges. When these parts are in extended or substantially horizontal positions, their inner, or unflanged edges abut and the two parts unite to constitute a single wagon-bed. Preferably one part of the body is of a slightly less length than the other so as to permit its flanges to enter the space between the flanges of the other part when the two parts are in their upright or substantially vertical positions, thus enabling the upper or outer portions of the two parts of the body to be brought closely together, as shown in Fig. 3. The necessary connections between the two parts of the body and the main frame may be formed in various manners, but that here shown is highly efficient. This connection is such as to permit the two parts of the body to have both a pivotal and a sliding movement. To this end we have rigidly secured to the main frame transverse frame members, or guide bars, 7, which are arranged respectively, near the front and rear ends of the body. Each guidebar comprises vertical portions which are rigidly secured to the respective frame members and a horizontal connecting portion. Each guidebar is provided in its vertical portions and in the adjacent parts of its horizontal portion with slots or guide ways 8. The two parts of the body portion lie between these transverse frame members, or guidebars, and each end of each part of the body is provided with an offset bar, or metallic loop, 9, which extend through the respective slots 8 and serve to attach the two parts of the body to the guidebars and to the main frame. These attaching loops, preferably comprise flat metal bars secured at their ends to the end flanges of the respective parts of the body and having their central portions bent outward a distance sufficient to enable them to enter and move in the respective slots 8. The positions of the attaching clips relative to the slotted guidebars is such that the parts of the body may be swung outward so as to bring the same into a substantially horizontal position, and when in this position the bars and body will rest upon the adjacent frame members and the inner portions of the bars will engage beneath the respective transverse frame members and thus limit the swing, or pivotal movement, of the parts of the body and retain the same in their adjusted positions.

To prevent edgewise movement of the parts of the body and to hold the inner edges thereof in abutment, or substantially so, we have provided each bar in its lower, or outer edge, with a notch 10 arranged to engage the upper edge of the longitudinal frame member when the parts of the body are in their horizontal positions. When it is desired to convert the vehicle into a velocipede the outer edges of the two parts of the body are swung upward and brought into engagement, as shown in Fig. 3. This movement causes the upper, or inner edges, of the bars 9 to engage the inner ends of the slots 8 and thus throw the lower ends of the bars and corresponding portions of the two parts of the body outward so that they will rest upon the inner flanges of the respective longitudinal frame members, which are preferably of angle iron. The upper edges of the two parts of the body are connected one to the other to retain them in this adjusted or folded position, and we preferably combine with this connecting device an attaching device for the velocipede saddle, which is shown at 11. To this end each part of the body portion is provided with clips 12 and arranged to receive the arms of an attaching device, or bracket, 13, which arms are so arranged as to enter the clips on the respective sides of the body and thus hold the two parts of the body against separation. The saddle 11 is secured to the upper, or transverse portion 14 of the attaching device. If desired the attaching device may be made adjustable so as to support the saddle at different heights. To accomplish this each arm thereof is provided with a series of apertures 15 and adapted to receive the reduced ends of a bar 16, which bar will rest upon the upper edge of the body and limit the downward movement of the attaching device.

The driving mechanism for the velocipede may be of any suitable character, preferably, however, a crank shaft 17 is mounted in brackets 18 carried by the main frame, and is provided at its outer ends with pedals 19, by means of which it may be rotated by the rider who occupies the saddle 11. Mounted on the shaft 17 is a sprocket wheel 20 which is connected by a chain 21 with a sprocket wheel 22 on the rear axle 3, to which it is rigidly secured and to which the ground wheels are rigidly secured, these ground wheels thus constituting driving wheels. To enable the velocipede to coast, or run ahead of the pedals, and also to permit the pedals to remain stationary when the vehicle is otherwise propelled, we prefer to mount the sprocket wheel 20 loosely upon the shaft 17 and to connect it with said shaft by means of suitable clutch devices. In order that the clutch action may be wholly automatic, we utilize an overrunning clutch. In the present construction we have shown a very simple form of clutch. As here shown the sprocket wheel 20 has secured to one face thereof a series of pins 23 and the shaft 17 has rigidly secured thereto a plate, or the like, 24, on which are mounted two pawls 25 arranged to engage the pins 23 when the shaft rotates at a greater speed than the sprocket wheel, and to permit the pins to ride over the same when the sprocket wheel rotates at a greater speed than the shaft. This is accomplished by pivotally mounting the pawls on the plate 24 and limiting their movement in one direction by pins 26. Thus when the plate 24 is moved forwardly by the pedals and the pawls engage the pins 23, the movement of the pawls will be limited by the pins 26 and a positive connection be established between the shaft and the sprocket wheel. When the sprocket wheel runs ahead of the shaft the pins 23 will engage the pawls and move them in the opposite direction. The pins 27 which limit the movement of the pawls in this opposite direction are so arranged that the pawls will move entirely out of the path of the pins.

The front wheels 4 constitute steering wheels and to this end the front axle 2 is pivotally mounted on the main frame in front of the body portion and provided with a steering post 28 having a handle 29 so arranged that it may be grasped and operated by the occupant of the saddle 11. The steering post is provided at its lower end with a crosshead 30, which is connected by rods 31 with the steering axle on opposite sides of its center. To facilitate the packing and shipping of the device, we have made the steering post in two parts one of which is provided with a screw-threaded sleeve 32 to receive a screw-threaded end 33 of the other part, thus permitting the ready separation of these parts. The vehicle is also provided with a tongue, or handle, 34, by means of which it may be pulled when in wagon form. This handle is preferably pivoted so that it can be folded out of the way when the device is in the form of a velocipede. As here shown it is pivotally connected to an upwardly curved bracket 35, the two parts of which are secured to the steering axle on the opposite side of its center. In the particular form of the device here shown, we have also provided the same with a second seat in which a passenger can be carried either when the vehicle is in the form of a wagon or a velocipede. This seat is preferably mounted on the main frame immediately in front of the steering post 28, as shown at 36, and a suitable foot-rest or support 37 is arranged above the front axle. It is also desirable that the device should be provided with runners so that it can be converted into a sled and the steering mechanism utilized in connection therewith. We have therefore shown runners 38 detachably secured to the several wheels. To this end the runners are formed of sheet metal with flanges at the sides to receive the rims of the wheels between them and are provided with lugs 39 through which a bolt, or other fastening device may be passed to firmly secure the runners to the wheels. Preferably the runners are ribbed, as shown at 40, to enable them to secure a better grip upon the supporting surface and to facilitate the steering of the vehicle.

The operation of the device will be readily understood from the foregoing description and it will be apparent that we have provided a convertible vehicle which is very simple in its construction and which is of a very strong, durable character, thus enabling it to be readily adjusted by a young boy and to withstand the rough usage to which such devices are usually subjected. Further it will be apparent that the construction and arrangement are such that the device has a wide range of utility in that it can be used in various manners to provide enjoyment for the boy who is operating the same.

While we have shown and described one embodiment of the invention, it will be understood that this is chosen for the purpose of illustration only, and we do not desire to be limited to the details here described as obvious modifications will occur to a person skilled in the art.

Having now fully described our invention, what we claim as new and wish to secure by Letters Patent, is:—

1. In a vehicle, foot-operated devices to propel the same, and a body portion comprising parts each foldable laterally toward the other, said parts being so arranged that when in their extended positions they will form a wagon bed and when in their folded positions will form a narrow elevated support for a velocipede seat.

2. In a vehicle, foot-operated devices for propelling the same, and a body portion comprising parts mounted for movement into extended positions to form a wagon bed and for movement into upright positions to form a support for a velocipede seat.

3. In a vehicle, steering wheels and driving wheels, foot-operated devices to actuate said driving wheels, a body portion supported adjacent to said foot-operated devices and comprising two parts, both of which are adjustable into different positions to constitute either a wagon bed or a support for a velocipede seat, a steering device mounted adjacent to said body portion in a position to permit of the adjustment of said body portion and operatively connected with said steering wheels, and another device connected with said steering wheels to move and steer the vehicle when said body portion is adjusted to form a wagon bed.

4. In a vehicle, a frame, wheels to support said frame, foot operated wheel-actuating devices supported by said frame, a body portion comprising two parts mounted on said frame and movable either into a substantially horizontal position or a substantially vertical position, and a seat adapted to be supported by said body portion when the two parts thereof are in substantially vertical positions.

5. In a vehicle, a frame, wheels to support said frame, foot operated wheel-actuating devices supported by said frame, a body portion comprising two parts mounted on said frame and movable either into a substantially horizontal position or a substantially vertical position, a seat, and means for attaching said seat to said body portion when the latter is in a vertical position and for retaining said body portion in a vertical position.

6. In a vehicle, foot operated devices for propelling the same, a body portion comprising two parts adapted to be folded one against the other, a seat, and an attaching device to secure said seat to said parts of said body portion and to prevent said parts of said body from being separated.

7. In a vehicle, a main frame, driving wheels and steering wheels connected with said main frame, a body portion comprising two parts mounted on said main frame and movable into either extended or folded positions, a seat, means to connect the seat to said body portion when the parts thereof are in their folded positions, and a steering device arranged adjacent to said body portion and connected with said steering wheels.

8. In a vehicle of the character described, a main frame, a body portion comprising two parts mounted at their inner edges on said main frame and movable into extended positions or upright positions, and adapted when in their extended positions to form a load supporting bed and when in their folded positions to form a support for a seat.

9. In a vehicle of the character described, a main frame, a body portion comprising two parts mounted at their inner edges on said main frame and movable into either extended positions or upright positions, and adapted when in their extended positions to form a load supporting bed and when in their upright positions to form a support for a seat, and a seat attaching device to secure a seat to said body portion and to retain the two parts thereof in their upright positions.

10. In a vehicle, a main frame, a body portion comprising two parts connected to said frame at their inner edges and movable into either extended positions or folded positions, clips secured to the respective parts of said body portion, a seat, and an attaching device secured to said seat and adapted to enter the clips on the respective parts of said body portion.

11. In a vehicle, a frame, a body portion comprising two parts, each part having one edge connected with said frame for both pivotal and sliding movement whereby said parts may be moved into either extended positions or folded positions.

12. In a vehicle, a frame comprising parts having guideways, and a body portion comprising two parts, each of said parts having a bar secured thereto and extending through one of said guideways.

13. In a vehicle, a frame comprising parts having guideways, and a body portion comprising two parts, each of said parts having a bar extending transversely thereof, secured at each end thereto, and slidably and pivotally mounted in one of said guideways.

14. In a vehicle, a frame comprising side members, transverse members connecting said side members and having slots therein near the respective side members, a body portion comprising two parts, each part having at each end thereof a bar extending transversely thereto and secured at each end thereto, said bars extending through the slots in the respective transverse members.

15. In a vehicle, a frame comprising side members, and a guide member having vertical portions secured to the respective side members of said frame and a transverse portion connecting said vertical portions and having slots formed in the adjacent parts of said vertical portions and said transverse portion, and a body comprising two parts, each having its inner edge arranged adjacent to one of said side members, and each part having at each end thereof a guide bar arranged transversely thereof and extending through the slot in the guide member of said frame.

16. In a vehicle, a frame comprising side members, and transverse members connecting said side members and having slots near the ends thereof, a body portion comprising two parts and arranged between said transverse members and having at each end thereof a transverse bar, secured at each end thereto and extending through one of said slots in the adjacent transverse member of said frame, and adapted for both pivotal and sliding movement in said slot, and means to prevent the sliding movement of said bars in the respective slots.

17. In a vehicle, a frame comprising side members having inwardly extending horizontal portions, connecting members each comprising vertical portions secured at their lower ends to the respective side members of said frame, and a horizontal portion connecting said vertical portions, the adjacent parts of said vertical and horizontal portions of said connecting members having slots therein, a body portion comprising two members provided at their ends with bars secured thereto and spaced therefrom and extending through the respective slots in said connecting members of said frame, said slots being so arranged that when the members of said body portion are in a substantially horizontal position said bars will rest upon said frame members and the inner ends of the bars will engage said connecting members to limit the movement of said body members, and when said body members are moved to a substantially vertical position said bars will engage the ends of said slots and cause the lower parts of said body members to be moved into positions to engage and rest upon the horizontal portions of said side members.

18. In a vehicle, a frame comprising side members having inwardly extending horizontal portions, connecting members each comprising vertical portions secured at their lower ends to the respective side members of said frame, and a horizontal portion connecting said vertical portions, the adjacent parts of said vertical and horizontal portions of said connecting members having slots therein, a body portion comprising two members provided at their ends with bars secured thereto and spaced therefrom and extending through the respective slots in said connecting members of said frame, said slots being so arranged that when the members of said body portion are in substantially horizontal positions said bars will rest upon said side members and the inner ends of the bars will engage said connecting members to limit the movement of said body members, and when said body members are moved to substantially vertical positions said bars will engage the ends of said slots and cause the lower parts of said body members to be moved into positions to engage and rest upon the horizontal portions of said side members, said bars having notches to receive the edges of the side members of said frame and hold said body members against sliding movement when in their horizontal positions.

19. In a vehicle, a frame comprising side members having inwardly extending horizontal portions, connecting members each comprising vertical portions secured at their lower ends to the respective side members of said frame, and a horizontal portion connecting said vertical portions, the adjacent parts of said vertical and horizontal portions of said connecting members having slots therein, a body portion comprising two members provided at their ends with bars secured thereto and spaced therefrom and extending through the respective slots in said connecting members of said frame, said slots being so arranged that when the members of said body portion are in substantially horizontal position said bars will rest upon said side members and the inner ends of the bars will engage said connecting members to limit the movement of said body members, and when said body members are moved to substantially vertical positions said bars will engage the ends of said slots and cause the lower parts of said body members to be moved into positions to engage and rest upon the horizontal portions of said side members, and means for retaining said body members in their vertical positions.

20. In a vehicle, a frame comprising side members having inwardly extending horizontal portions, connecting members each comprising vertical portions secured at their lower ends to the respective side members of said frame, and a horizontal portion connecting said vertical portions, the adjacent parts of said vertical and horizontal portions of said connecting members having slots therein, a body portion comprising two members provided at their ends with bars secured thereto and spaced therefrom and extending through the respective slots in said connecting members of said frame, said slots being so arranged that when the members of said body portion are in substantially horizontal positions said bars will rest upon said side members and the inner ends of the bars will engage said connecting members to limit the movement of said body members, and when said body members are moved to substantially vertical positions said bars will engage the ends of said slots and cause the lower parts of said body members to be moved into positions to engage and rest upon the horizontal portions of said side members, a saddle, and an attaching device for securing said saddle to said body portion and comprising arms adapted to straddle the vertically arranged members of said body and to retain the same in their vertical positions.

21. In a vehicle, a frame, a body portion comprising two parts movable into either upright or extended positions, each part having flanges at three edges thereof, and said parts having their unflanged edges arranged to be moved into abutting relation when the parts of said body portion are in their extended positions and to be spaced apart when said parts of said body portion are in their upright positions, one part of said body portion being of less width than the other to permit its flanges to enter the space between the flanges of the other part when the two parts are moved toward their upright positions.

22. In a vehicle, a frame comprising side members spaced apart, a body portion mounted on said frame and comprising two parts mounted on the respective side members of said frame for both pivotal movement and transverse movement whereby said parts may be moved either into an extended position or into a folded position with their lower edges arranged adjacent to the respective side members of said frame.

23. In a vehicle, a frame, a body portion mounted on one end of said frame and comprising two parts movable either into extended positions to constitute a wagon bed or into upright positions to constitute a support for a seat, a second seat mounted on said frame in advance of said body portion, and a steering device permanently mounted on said frame between the last-mentioned seat and the body portion.

24. In a vehicle, a frame, steering wheels and driving wheels secured to said frame, foot operated devices connected with said driving wheels, a body portion arranged above said foot operated devices and comprising two parts movable either into an extended position or a folded position, a velocipede seat, means for securing the same to said body portion when the latter is in its folded position, a second seat arranged in advance of said body portion, a steering device mounted on said frame between said second seat and said body portion and connected with said steering wheels, and a handle connected with said steering wheels.

In testimony whereof, we affix our signatures hereto.

WALTER M. LOXLEY.
SAMUEL E. LOXLEY.

Copies of this patent may be obtained for five cents each, by addressing the "Commissioner of Patents, Washington, D. C."